United States Patent
Sandberg et al.

(10) Patent No.: US 8,620,370 B2
(45) Date of Patent: Dec. 31, 2013

(54) PROCEDURE LATENCY BASED ADMISSION CONTROL NODE AND METHOD

(75) Inventors: Pontus Sandberg, Linkoping (SE); Walter Müller, Upplands Vasby (SE); Peter Östrup, Linkoping (SE); Stefan Johansson, Linkoping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 241 days.

(21) Appl. No.: 13/218,593

(22) Filed: Aug. 26, 2011

(65) Prior Publication Data

US 2013/0053085 A1  Feb. 28, 2013

(30) Foreign Application Priority Data

Aug. 25, 2011 (WO) ................ PCT/SE2011/051025

(51) Int. Cl.
*H04J 3/06* (2006.01)
(52) U.S. Cl.
USPC .................... 455/517; 455/453; 455/422.1
(58) Field of Classification Search
USPC ............ 455/67.11, 115.1, 226.1, 414.1, 453, 455/403, 422.1, 561, 517; 370/230–235
See application file for complete search history.

(56) References Cited

U.S. PATENT DOCUMENTS

| 6,542,462 | B1 | 4/2003 | Sohraby et al. |
| 7,586,865 | B2 * | 9/2009 | Ostman et al. ............... 370/318 |
| 7,826,472 | B2 * | 11/2010 | Kappes et al. ............... 370/445 |
| 2002/0025820 | A1 * | 2/2002 | Fauconnier et al. .......... 455/452 |
| 2003/0165116 | A1 * | 9/2003 | Fallon et al. ............... 370/230.1 |
| 2004/0062207 | A1 * | 4/2004 | Gross ............................. 370/252 |
| 2004/0082338 | A1 | 4/2004 | Norrgard et al. |
| 2005/0190797 | A1 * | 9/2005 | Elliot ............................. 370/503 |
| 2006/0029037 | A1 | 2/2006 | Chen et al. |
| 2006/0187952 | A1 * | 8/2006 | Kappes et al. ............... 370/445 |
| 2007/0140128 | A1 * | 6/2007 | Klinker et al. ............... 370/238 |
| 2010/0227619 | A1 * | 9/2010 | Lee et al. ..................... 455/438 |
| 2011/0080961 | A1 * | 4/2011 | Hui et al. ..................... 375/259 |

OTHER PUBLICATIONS

3GPP. 3rd Generation Partnership Project; Technical Specification Group Radio Access Network; Evolved Universal Terrestrial Radio Access Network (E-UTRAN); S1 Application Protocol (S1AP) (Release 9). 3GPP TS 36.413 V9.6.1 (May 2011).
3GPP. 3rd Generation Partnership Project; Technical Specification Group Radio Access Network; Evolved Universal Terrestrial Radio Access Network (E-UTRAN); X2 application protocol (X2AP) (Release 9). 3GPP TS 36.423 V9.6.0 (Mar. 2011).
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10) 3GPP TS 36.300 v10.3.0 (Mar. 2011).

* cited by examiner

Primary Examiner — Dominic E Rego

(57) ABSTRACT

A wireless telecommunication system, a node (e.g., eNodeB, BSC, RNC), a procedure latency monitor unit, and a method are described herein for measuring the latency of a procedure (e.g., radio network procedure, core network procedure) where the results of the measured latency may be used for admission control of user equipment (UE) sessions and to guarantee that admitted UEs are served according to their requested Quality of Service (QoS).

21 Claims, 5 Drawing Sheets

PROCEDURE LATENCY BASED ADMISSION CONTROL NODE AND METHOD

RELATED APPLICATIONS

This application claims the benefit of International Application No. PCT/SE2011/051025, filed Aug. 25, 2011, the disclosure of which is fully incorporated herein by reference.

TECHNICAL FIELD

The present invention relates to a wireless telecommunication system, a node (e.g., eNodeB, eNB, BSC, RNC), a procedure latency monitor unit, and a method for measuring the latency of a procedure e.g., radio network procedure, core network procedure where the results of the measured latency may be used for admission control of user equipment (UE) sessions and to guarantee that admitted UEs are served according to their requested Quality of Service (QoS).

BACKGROUND

The following abbreviations are herewith defined, at least some of which are referred to within the following description about at least the prior art and/or the present invention.
BSC Base Station Controller
CDMA Code Division Multiple Access
CN Core Network
CPU Central Processing Unit
EPC Evolved Packet Core
ERAB EUTRAN Radio Access Bearers
GSM Global System for Mobile Communications
LTE Long Term Evolution
PLM Procedure Latency Monitor
PRB Physical Resource Block
QoS Quality of Service
RAN Radio Access Network
RNC Radio Network Controller
RRC Radio Resource Control
tPLM Procedure Latency Mean time
UE User Equipment
WCDMA Wideband Code Division Multiple Access In a wireless telecommunication system, admission control (capacity management) is a function implemented in the node (e.g., eNodeB, BSC, RNC) that manages a number of UE sessions. Admission control is needed to handle new, ongoing and incoming UE connections due to e.g. handover or roaming or establishment of connections, and to guarantee that admitted UEs are served according to their requested Quality of Service (QoS). In addition, admission control is needed when the offered load is much higher than the node's engineered capacity. For example, when the node (e.g., eNodeB, BSC, RNC) encounters a situation with high load, the node's admission control mechanism has the responsibility to throttle (e.g., reduce) the load so it remains within the node's engineered capacity. This is valid for ongoing, new and incoming UE connections due to e.g. handover.

For example, in LTE the eNodeB's admission control mechanism uses both hard limits (e.g., the number of licenses in use) and dynamic limits (e.g., the utilization ratio of the PRB resources). Basically, the eNodeB is configured to implement its own utilization measure for each internal resource that is a potential bottleneck. And, during the eNodeB operation a different type of traffic pattern will create its own particular bottlenecks. Thus, when designing and programming or configuring the eNodeB it is difficult to predict which internal resources that will run out due to high traffic load and which internal resources that need to be monitored. The eNodeB's internal resources may be for example:
  Number of connected users
  Number of bearers per user (signaling and data)
  CPU utilization
  Signal buffer sizes Accordingly, there is and has been a need for enhancing the traditional node (e.g., eNodeB, BSC, RNC) to address these shortcomings and other shortcomings to improve at least the admission control function to handle new, ongoing and incoming UE connections. This need and other needs are satisfied by the exemplary embodiments of the present invention.

SUMMARY

A node (e.g., eNodeB, eNB, BSC, RNC), a procedure latency monitor unit, a method, and a wireless telecommunication system that address the shortcomings of the prior art are described in the independent claims of the present application. Advantageous embodiments of the node (e.g., eNodeB, eNB, BSC, RNC), the procedure latency monitor unit, the method, and the wireless telecommunication system have been described in the dependent claims of the present application.

In an aspect of exemplary embodiments of the present invention there is provided a node (e.g., eNodeB, eNB, BSC, RNC) located in a wireless telecommunications network and configured to administer a number of sessions with UEs. The node comprises a procedure latency monitor unit and an admission control mechanism. The procedure latency monitor unit is configured to establish a measurement window associated with a procedure within the wireless telecommunications network and during the measurement window is further configured to measure a predetermined number of delta times, where each measured delta time indicates an amount of time that takes place between a start of the procedure and a stop of the procedure. In addition, the procedure latency monitor unit upon completion of the measurement window is configured to take the predetermined number of measured delta times and is further configured to calculate a mean delta time which is an average of the measured delta times. Furthermore, the procedure latency monitor unit is configured to compare the mean delta time with a predetermined threshold which is also associated with the procedure and if the mean delta time exceeds the threshold then the procedure latency monitor unit is configured to issue a high load signal associated with the procedure. The admission control mechanism is configured to receive the high load signal associated with the procedure and is further configured to activate an admission action. An advantage of the node is that it may better steer the admission control function and determine when an internal resource has reached its engineered capacity.

In yet another aspect of exemplary embodiments of the present invention there is provided a method implemented by a node (e.g., eNodeB, eNB, BSC, RNC) located in a wireless telecommunications network and configured to administer a number of sessions with UEs. The method comprises: (a) establishing, in a procedure latency monitor unit, a measurement window associated with a procedure within the wireless telecommunications network and during the measurement window measuring a predetermined number of delta times, where each measured delta time indicates an amount of time that takes place between a start of the procedure and a stop of the procedure; (b) taking, in the procedure latency monitor unit, the predetermined number of measured delta times upon completion of the measurement window and calculating a mean delta time which is an average of the measured delta times; (c) comparing, in the procedure latency monitor unit, the mean delta time with a predetermined threshold which is also associated with the procedure and if the mean delta time exceeds the threshold then issuing a high load signal associated with the procedure; and (d) receiving, at an admission control mechanism, the high load signal associated with the procedure then activating an admission action. An advantage of the method is that it enables the node to better steer the admission control function and determine when an internal resource has reached its engineered capacity.

In still yet another aspect of exemplary embodiments of the present invention there is provided a procedure latency monitor unit which is part of a wireless telecommunication network. The procedure latency monitor unit comprises a processor and a memory that stores processor-executable instructions therein where the processor interfaces with the memory and executes the processor-executable instructions to enable the following: (a) establish a measurement window associated with a procedure within the wireless telecommunications network and during the measurement window measure a predetermined number of delta times, where each measured delta time indicates an amount of time that takes place between a start of the procedure and a stop of the procedure; (b) take the predetermined number of measured delta times upon completion of the measurement window and calculate a mean delta time which is an average of the measured delta times; and (c) compare the mean delta time with a predetermined threshold which is also associated with the procedure and if the mean delta time exceeds the threshold then issue a high load signal associated with the procedure. An advantage of the procedure latency monitor unit is that it enables the node to better steer the admission control function and determine when an internal resource has reached its engineered capacity.

In yet another aspect of exemplary embodiments of the present invention there is provided a method implemented by a procedure latency monitor unit which is located in a wireless telecommunications network. The method comprises: (a) establishing a measurement window associated with a procedure within the wireless telecommunications network and during the measurement window measuring a predetermined number of delta times, where each measured delta time indicates an amount of time that takes place between a start of the procedure and a stop of the procedure; (b) taking the predetermined number of measured delta times upon completion of the measurement window and calculating a mean delta time which is an average of the measured delta times; and (c) comparing the mean delta time with a predetermined threshold which is also associated with the procedure and if the mean delta time exceeds the threshold then issuing a high load signal associated with the procedure. An advantage of the method is that it enables the node to better steer the admission control function and determine when an internal resource has reached its engineered capacity.

In still yet another aspect of exemplary embodiments of the present invention there is provided a wireless telecommunications network which comprises a core network and a node (e.g., eNodeB, eNB, BSC, RNC) connected to the core network and configured to administer a number of sessions with UEs. The node comprises a procedure latency monitor unit and an admission control mechanism. The procedure latency monitor unit is configured to establish a measurement window associated with a procedure within the wireless telecommunications network and during the measurement window is further configured to measure a predetermined number of delta times, where each measured delta time indicates an amount of time that takes place between a start of the procedure and a stop of the procedure. In addition, the procedure latency monitor unit upon completion of the measurement window is configured to take the predetermined number of measured delta times and is further configured to calculate a mean delta time which is an average of the measured delta times. Furthermore, the procedure latency monitor unit is configured to compare the mean delta time with a predetermined threshold which is also associated with the procedure and if the mean delta time exceeds the threshold then the procedure latency monitor unit is configured to issue a high load signal associated with the procedure. The admission control mechanism is configured to receive the high load signal associated with the procedure and is further configured to activate an admission action. An advantage of the node is that it may better steer the admission control function and determine when an internal resource has reached its engineered capacity.

In yet another aspect there is provided a procedure latency monitor unit which is located in a wireless telecommunications network. The procedure latency monitor unit comprises a processor and a memory that stores processor-executable instructions therein where the processor interfaces with the memory and executes the processor-executable instructions to enable the following: (a) establish a measurement window when a procedure in the wireless telecommunications network has a delta time that exceeds a predetermined threshold, where the delta time is an amount of time that takes place between a start of the procedure and a stop of the procedure; (b) set a number of delta time measurements for the procedure that are to be completed during the measurement window; (c) wait for the procedure to occur; (d) when the procedure occurs, calculate a delta time which indicates an amount of time that takes place between a start of the procedure and a stop of the procedure; (e) decrement by one the number of delta time measurements that need to be completed during the measurement window; (f) determine if completed all of the delta time measurements that were set to be completed during the measurement window; (g) if the result of the determine step is no, then return and perform the wait operation; (h) if the result of the determine step is yes, then: (i) stop the delta time measurement; (ii) calculate a mean delta time which is an average of the measured delta times for the procedure; (iii) check if the mean delta time exceeds a predetermined threshold which is associated with the procedure; (iv) if the result of the check operation is yes, then send a high load signal associated with the procedure; and (v) if the result of the check operation is no, then determine if there is an outstanding high load signal and if not then end otherwise send a cease high load signal associated with the procedure. An advantage of the procedure latency monitor unit is that it enables the node to better steer the admission control function and determine when an internal resource has reached its engineered capacity.

In still yet another aspect of exemplary embodiments of the present invention there is provided a method implemented by a procedure latency monitor unit which is located in a wireless telecommunications network. The method comprises: (a) establishing a measurement window when a procedure in the wireless telecommunications network has a delta time that exceeds a predetermined threshold, where the delta time is an amount of time that takes place between a start of the procedure and a stop of the procedure; (b) setting a number of delta time measurements for the procedure that are to be completed during the measurement window; (c) waiting for the procedure to occur; (d) when the procedure occurs, calculating a delta time which indicates an amount of time that takes place between a start of the procedure and a stop of the procedure; (e) decrementing by one the number of delta time measurements that need to be completed during the measurement window; (f) determining if completed all of the delta time measurements that were set to be completed during the measurement window; (g) if the result of the determining step is no, then return and perform the waiting step; (h) if the result of the determining step is yes, then: (i) stopping the delta time measurement; (ii) calculating a mean delta time which is an average of the measured delta times for the procedure; (iii) checking if the mean delta time exceeds a predetermined threshold which is associated with the procedure; (iv) if the result of the checking step is yes, then sending a high load signal associated with the procedure; and (v) if the result of the checking is no, then determining if there is an outstanding high load signal and if not then end otherwise sending a cease high load signal associated with the procedure. An advantage of the method is that it enables the node to better steer the admission control function and determine when an internal resource has reached its engineered capacity.

Additional aspects will be set forth, in part, in the detailed description, figures and any claims which follow, and in part will be derived from the detailed description, or may be learned by practice of the exemplary embodiments of the present invention. It is to be understood that both the foregoing general description and the following detailed description are exemplary and explanatory only and are not restrictive of the invention as disclosed.

BRIEF DESCRIPTION OF THE DRAWINGS

A more complete understanding of the presently described embodiments may be obtained by reference to the following detailed description when taken in conjunction with the accompanying drawings.

DETAILED DESCRIPTION

Figure 1:
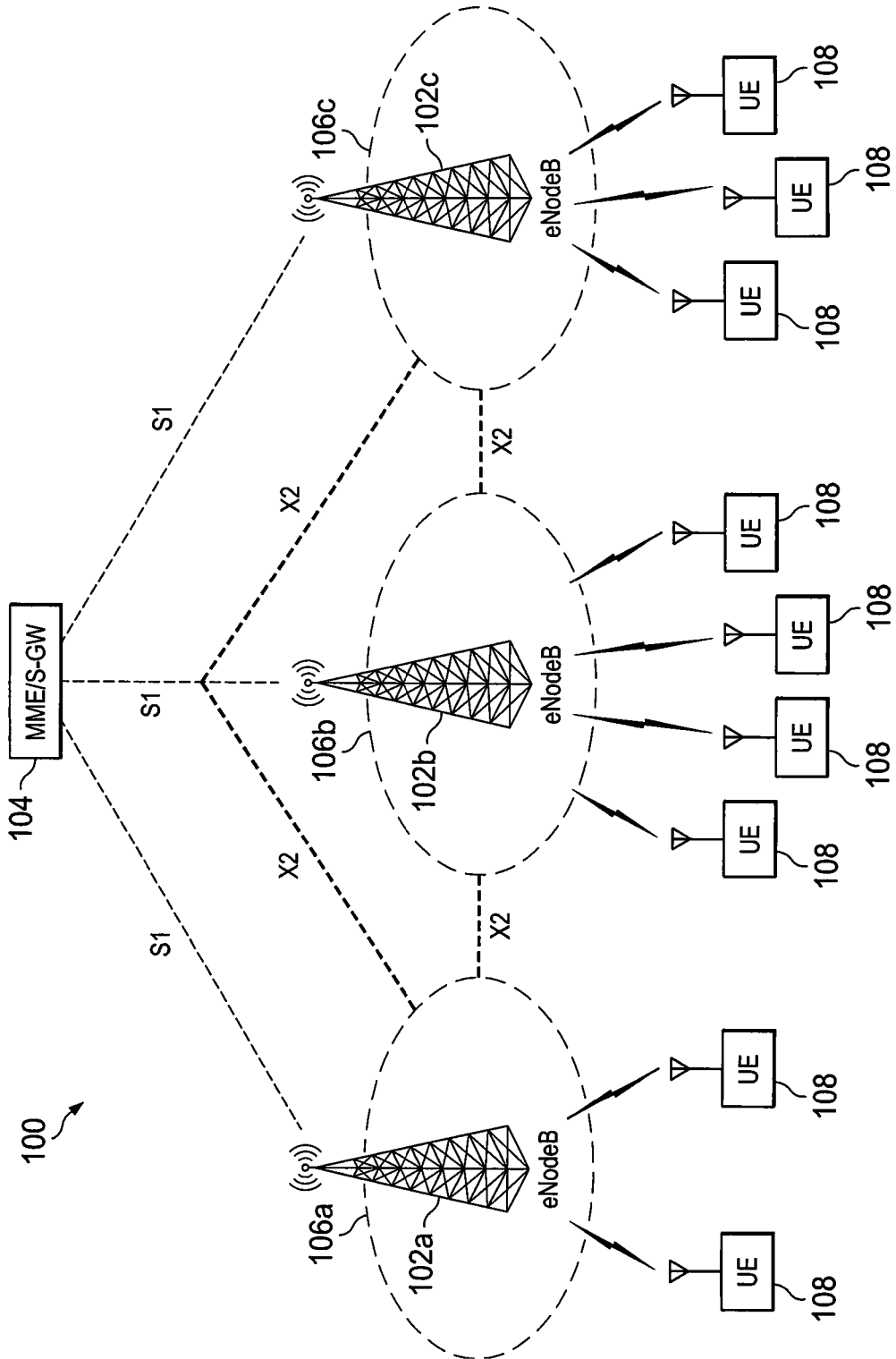
FIG. 1 is a block diagram of an exemplary LTE wireless telecommunication system which has eNodeBs configured in accordance with an embodiment of the present invention.

Referring to FIG. 1, there is a block diagram of an exemplary LTE wireless telecommunication system 100 which has eNodeBs 102*a*, 102*b* and 102*c* (only three shown) each configured in accordance with an embodiment of the present invention. In this example, the LTE wireless telecommunication system 100 includes a MME/S-GW 104 (e.g., core network 104) which has Si interfaces with the three eNodeBs 102*a*, 102*b* and 102*c*. The eNodeBs 102*a*, 102*b* and 102*c* respectively manage their own cells 106*a*, 106*b* and 106*c* which have their own radio cover areas within which there may be one or more UEs 108. The eNodeBs 102*a*, 102*b* and 102*c* utilize RRC signaling to interface with their respective UEs 108. In addition, the eNodeBs 102*a*, 102*b* and 102*c* communicate with one another over multiple X2 interfaces. The exemplary LTE wireless telecommunication system 100 may support many UEs 108 and includes many other components which are well known in the art but for clarity are not described herein while the eNodeBs 102*a*, 102*b* and 102*c* or nodes in accordance with the presently described exemplary embodiments are described in detail herein. A detailed description is provided next to explain how the eNodeBs 102*a*, 102*b* and 102*c* are configured to address the shortcomings of the prior art and improve the admission control function to better handle new, ongoing and incoming UE connections. The eNodeBs 102*a*, 102*b* and 102*c* also have many well known components (e.g., receiver, transmitter) incorporated therein but for clarity those well known components are not described herein.

Figure 2:
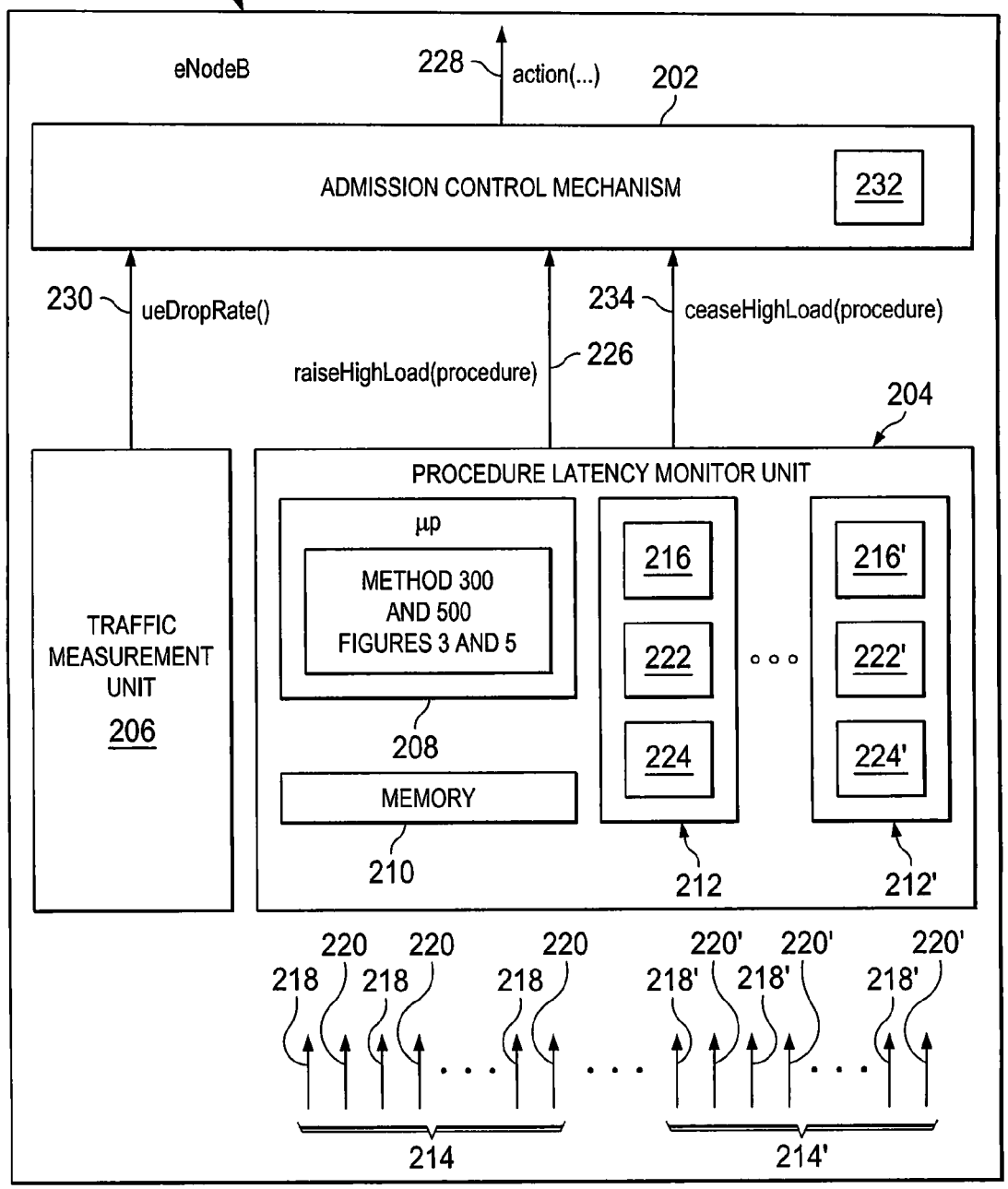
FIG. 2 is a block diagram that illustrates in greater detail the components in one of the eNodeBs shown in FIG. 1 configured in accordance with an embodiment of the present invention.
Figure 3:
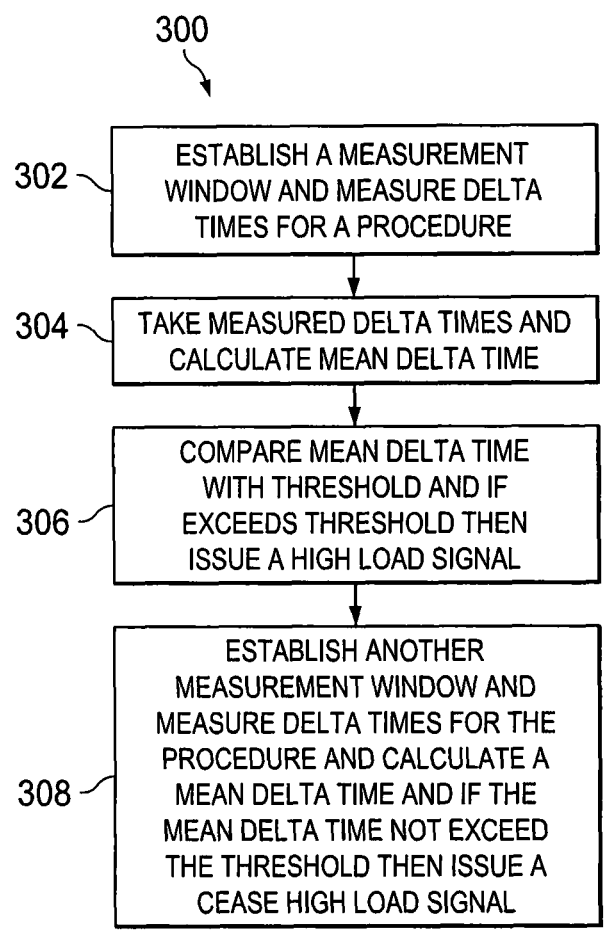
FIG. 3 is a flowchart illustrating the basic steps of an exemplary method implemented by a procedure latency monitor unit (incorporated within the eNodeB) in accordance with an embodiment of the present invention.

Referring to FIGS. 2 and 3, there are shown a block diagram and a flowchart respectively illustrating the eNodeB 102*a* (for example) and the method 300 implemented therein in accordance with an exemplary embodiment of the present invention. As shown, the eNodeB 102*a* includes an admission control mechanism 202, a procedure latency monitor unit 204, and an optional traffic measurement unit 206. The procedure latency monitor unit 204 includes a processor 208 and a memory 210 that stores processor-executable instructions therein where the processor 208 interfaces with the memory 210 and executes the processor-executable instructions to enable the following: (a) establish a measurement window 212 associated with a procedure 214 within the wireless telecommunications network 100 and during the measurement window 212 measures a predetermined number of delta times 216, where each measured delta time 216 indicates an amount of time that takes place between a start 218 of the procedure 214 and a stop 220 of the procedure 214 (step 302 in FIG. 3)(see also description associated with FIG. 4); (b) take the predetermined number of measured delta times 216 upon completion of the measurement window 212 and calculate a mean delta time 222 which is an average of the measured delta times 216 (see step 304 in FIG. 3); and (c) compare the mean delta time 222 with a predetermined threshold 224 which is also associated with the procedure 214 and if the mean delta time 222 exceeds the threshold 224 then issue a high load signal 226 (e.g., raiseHighLoad (procedure) 226) associated with the procedure 214 (step 306 in FIG. 3). Thereafter, the admission control unit 202 upon receiving the high load signal 226 (e.g., raiseHighLoad (procedure) 226) associated with the procedure 214 is configured to activate an admission action 228.

The traffic measurement unit 206 may be used in conjunction with the procedure latency monitor unit 204 to provide additional information 230 (e.g., dropped UE sessions 230) to the admission control mechanism 202. For example, the traffic measurement unit 206 may be configured to determine the number of sessions with the UEs 108 which are dropped without being requested to be released by the UEs 108 and then report the number of dropped UE sessions 230 to the admission control mechanism 202. Thereafter, the admission control mechanism 202 upon receiving the high load signal 226 associated with the procedure 214 further determines if the number of dropped UE sessions 230 exceeds a predetermined threshold 232 and if yes then activates the admission action 228. For example, the admission action 228 may include anyone or a combination of the following:

Block one or more new UEs trying to connect to the eNodeB level.
Release one or more UEs 108 already connected based on a priority class;
Block a new data radio bearer setup.
Release of one or more data radio bearers.
Reduce observability monitoring.
Etc.

If desired, the procedure latency monitor unit 204 may establish additional measurement windows 212' to measure additional delta times 216' for additional different procedures 214' and then calculate additional mean delta times 222' for the additional different procedures 214' where if one or more of the calculated mean delta times 222' exceed a corresponding threshold 224' then issue one or more high load signals 226 associated with the corresponding one or more different procedures 214'. In particular, the procedure latency monitor unit 204 for each additional monitored procedure 214' would: (a) establish a measurement window 212' associated with that procedure 214' within the wireless telecommunications network 100 and during the measurement window 212' measures a predetermined number of delta times 216', where each measured delta time 216' indicates an amount of time that takes place between a start 218' of that procedure 214' and a stop 220' of that procedure 214'; (b) take the predetermined number of measured delta times 216' upon completion of the measurement window 212' and calculate a mean delta time 222' which is an average of the measured delta times 216'; and (c) compare the mean delta time 222' with a predetermined threshold 224' which is also associated with that procedure 214' and if the mean delta time 222' exceeds the threshold 224' then issue a high load signal 226 (e.g., raiseHighLoad (procedure) 226) associated with the procedure 214'. For example, the procedure latency monitor unit 204 may monitor one or more procedures 214 and 214' which include radio network procedures and/or core network procedures such as anyone of the following:
a RRCConnectionSetup.
an InitialContextSetup.
an ERABSetup.
a HandoverPreparation.
A procedure that interacts with another node other than UEs 108.
Etc.

Once, the procedure latency monitor unit 204 issues the high load signal 226 which is associated with anyone of the procedures 214 or 214' then the processor 208 may further execute the processor-executable instructions to establish another measurement window 212 or 212' for that procedure 214 or 214' to measure multiple delta times 216 or 216' for that procedure 214 or 214' and then calculate the mean delta time 222 or 222' for that procedure 214 or 214' where if the calculated mean delta time 222 or 222' does not exceed the threshold 224 or 224' for that procedure 214 or 214' then issue a cease high load signal 234 (e.g., ceaseHighLoad (procedure) 234) associated with that procedure 214 or 214' (see step 308 in FIG. 3).

The procedure latency monitor unit 204 may establish the measurement window 212 or 212' pursuant steps 302 or 308 when the corresponding procedure 214 or 214' has a delta time that exceeds a predetermined threshold 224 or 224' (or different threshold) where the delta time is an amount of time that takes place between a start 218 or 218' of the procedure 214 or 214' and a stop 220 or 220' of the procedure 214 or 214'. A more detailed description about when the measurement window 212 or 212' may be established pursuant steps 302 or 308 is provided below with respect to FIG. 4.

As can be seen, the eNodeB 102a (for example) described above provides a way of monitoring the procedures 214 and 214' (e.g., radio network procedures, core network procedures) to trigger one or more admission control actions 228. In particular, the eNodeB 102a measures the latency of procedures 214 and 214' and when there is an increased procedure time then initiate admission control supervision. Alternatively, the eNodeB 102a measures the latency of procedures 214 and 214' and the dropped UE sessions 230 and when there is an increased procedure time and an increased UE drop rates then initiate admission control supervision.

For every procedure 214 (for example) used in the supervision of the admission control, there is a defined threshold $t_0$ 224. In addition, there is a delta time 216 that is measured for each procedure 214 (for example) which is the time between the start 218 of procedure 214 and the stop 220 of the procedure 214. If no measurement is ongoing for the procedure 214 (for example), then a new measurement window 212 may be established and subsequent delta time 216 measurements started when a delta time breaches the $t_0$ threshold 224, i.e. when the first procedure 214 exceeded its maximum delay time (see FIG. 4). The measurement window 212 is active for the procedure 214 (for example) until N delta times 216 have been collected (i.e., N procedures 214 have started and completed). Once the measurement window 212 is closed, then a statistical evaluation of procedure delta times 216 may be performed so a determination may be made on whether or not any succeeding admission actions have to be performed, i.e. activate the admission control.

Figure 4:
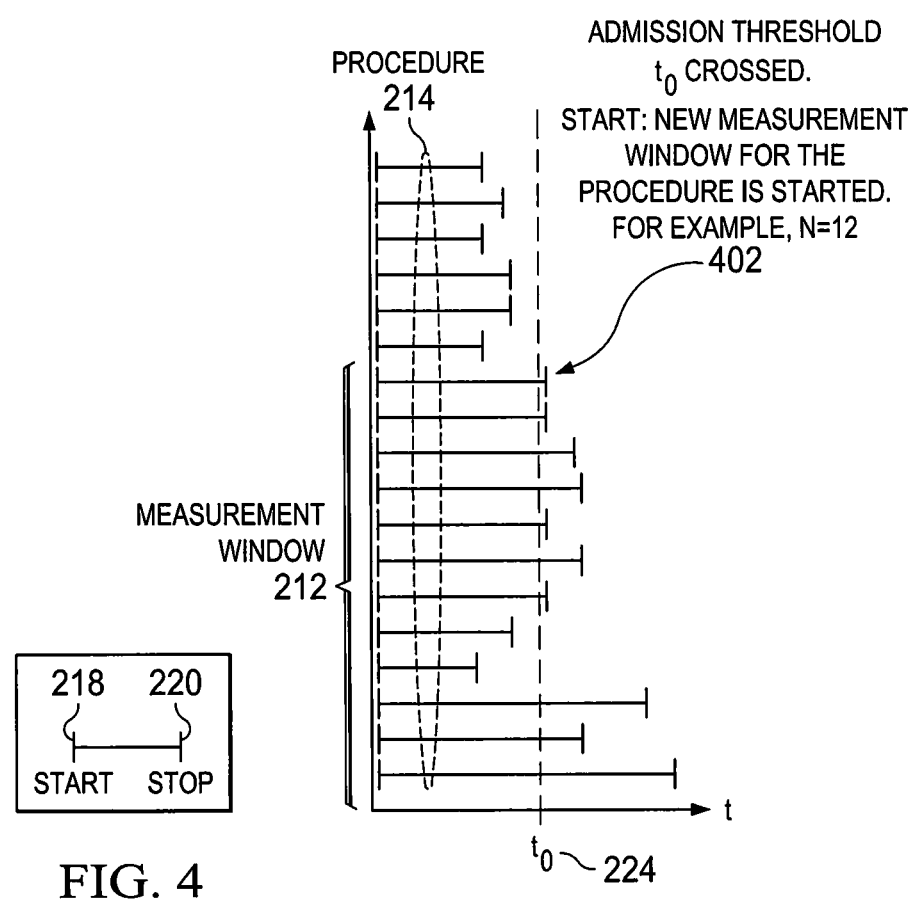
FIG. 4 is a diagram illustrating used to help explain how the procedure latency monitor unit (incorporated within the eNodeB) may perform a latency procedure measurement in accordance with an embodiment of the present invention.

Referring to FIG. 4, there is illustrated a latency measurement example where for procedure 214 (for example) there is a new measurement window 212 created when a delta time measurement 402 breaches the threshold $t_0$ 224. Then, after the creation of the new measurement window 212 several N delta times 216 are collected such that the mean delta time 222 may be calculated (i.e., N procedures 214 have started and completed). In this example, N=12. Of course N may take any appropriate value as it is a design parameter. In particular, every procedure 214 and 214' has a measurement window 212 and 212' that is used to create a mean delta time 222 and 222' based on N number of measured delta times 216 or 216' for the respective procedure 214 and 214'. When all N delta times 216 and 216' have been measured for the procedure 214 and 214' in the measurement window 212 and 212' then the procedure latency monitor unit 204 calculates the procedure latency mean time (tPLM) 222 and 222' for the monitored procedure 214 and 214'. A mean value is used to avoid the adverse effects of any possible oscillating behavior of the function.

The procedure latency monitor unit 204 may collect procedure latency measurements 216 and 216' (delta times 216 and 216') simultaneously for all monitored procedures 214 and 214'. Admission control may be triggered if at least one procedure 214 and 214' has a mean delta time 222 and 222' which exceeds its threshold 224 and 224'. A possible enhancement is to include a dependency between procedure delta times such as follows:

$$\frac{1}{N}\sum_{i=0}^{N}\Delta t_i = tPLM$$

The formula above calculates a mean procedure time for all (N) measured procedures. In this case, the admission control is being triggered when all the mean time of all procedures exceeds the configured threshold for overload.

In any case, when all N delta time 216 and 216' measurements for a particular procedure 214 or 214' have been collected, and the decision about whether or not an indication 226 shall be sent to the admission control mechanism 202 has been taken, then the measurement window 212 and 212' shall be closed. A new measurement window 212 and 212' will be started when the next delta time 216 and 216' has breached the $t_o$ threshold 224 and 224' for that particular procedure 214 and 214'.

Every monitored procedure 214 and 214' has a configurable threshold 224 and 224' at which the admission control mechanism 202 is triggered with a high load signal 226 (raiseHighLoad(procedure) 226). The actions 228 that may be performed by the admission control mechanism 202 upon receiving the high load signal 226 may include anyone or a combination of the following (for example):

Block one or more new UEs trying to connect to the eNodeB level.
Release one or more UEs 108 already connected based on a priority class;
Block a new data radio bearer setup.
Release of one or more data radio bearers.
Reduce observability monitoring.
Etc.

After a situation where the procedure latency monitor unit 204 has sent the high load signal 226 (raiseHighLoad(procedure) 226) for a corresponding procedure 214 and 214'. If the procedure latency monitor unit 204 has determined that the mean delta time 222 has been lowered below the $t_0$ threshold 224 and 224' for that procedure 214 and 214' after the evaluation of the next measurement window 212 and 212', then any outstanding admission action for that procedure 214 and 214' may be ceased by issuing the cease high load signal 234 (e.g., ceaseHighLoad (procedure) 234) towards the admission control mechanism 202.

Figure 5:
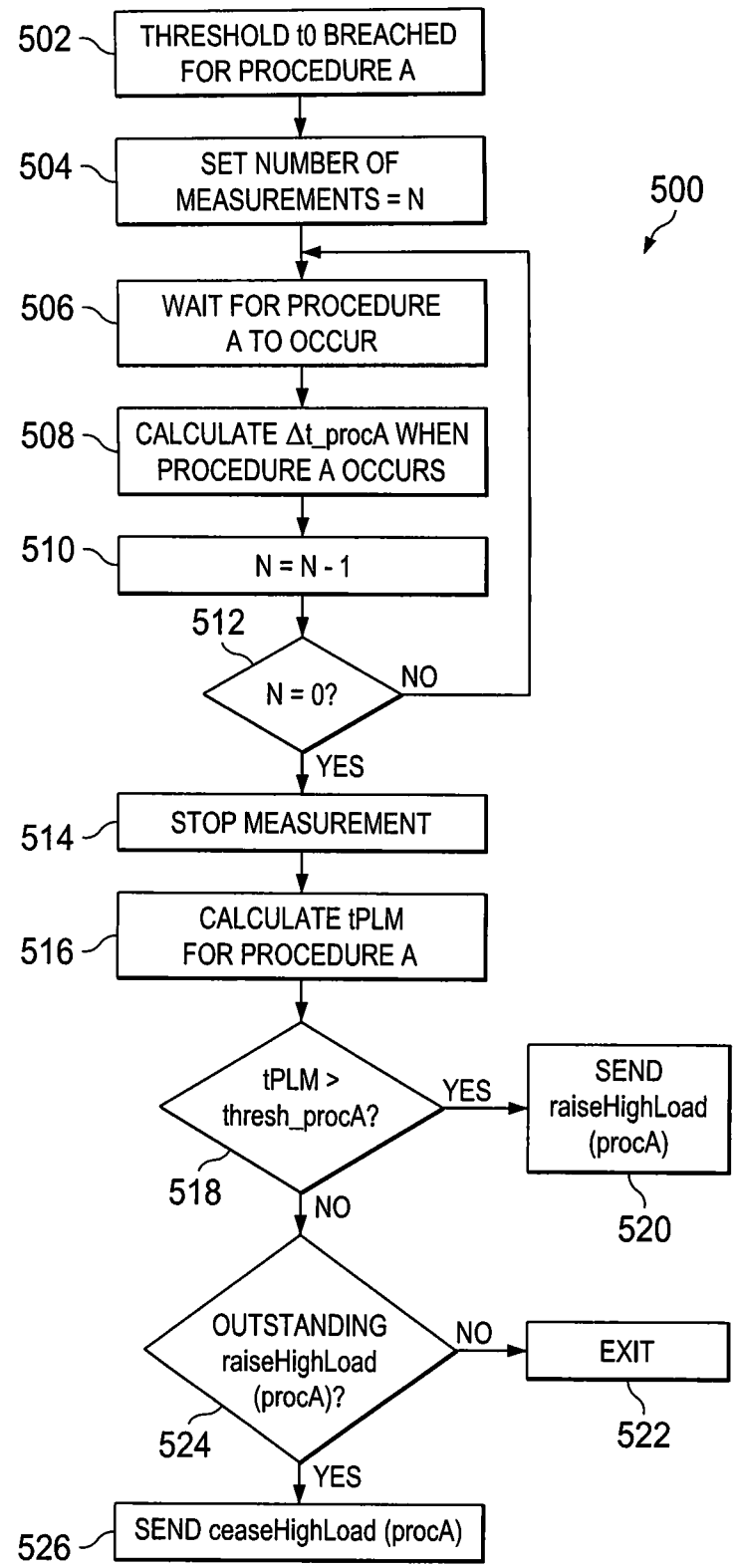
FIG. 5 is a flowchart illustrating the basic steps of another exemplary method implemented by the procedure latency monitor unit (incorporated within the eNodeB) in accordance with an embodiment of the present invention.

Referring to FIG. 5, there is a flowchart illustrating the basic steps of an exemplary method 500 implemented by the procedure latency monitor unit 204 in accordance with an embodiment of the present invention. Beginning at step 502, establish the measurement window 212 when the procedure 214 (e.g., procedure A) has a delta time 216 that exceeds the predetermined threshold 224, where the delta time 216 is an amount of time that takes place between a start 218 of the procedure 214 and a stop 220 of the procedure 214. At step 504, set a number of N delta time measurements 216 for the procedure 214 that are to be completed during the measurement window 212. At step 506, wait for the procedure 214 to occur. At step 508, when the procedure 214 occurs, calculate the delta time 216 which indicates an amount of time that takes place between the start 218 of the procedure 214 and the stop 220 of the procedure 214. At step 510, decrement by one the number of N delta time 216 measurements that need to be completed during the measurement window 212. At step 512, determine if completed all of the N delta time 216 measurements that were set to be completed during the measurement window 212 (e.g., determine if N=0). If the result of the determine step 512 is no, then return and perform the wait step 506. If the result of the determine step 512 is yes, then at step 514 stop the delta time 216 measurement. At step 516, calculate the mean delta time 222 which is an average of the measured delta times 216 for the procedure 214. At step 518, check if the mean delta time 222 exceeds the predetermined threshold 224 which is associated with the procedure 214. If the result of the check step 518 is yes, then at step 520 send the high load signal 226 (raiseHighLoad(procedure) 226) associated with the procedure 214 to the admission control mechanism 202. If the result of the check step 518 is no, then at step 524 determine if there is an outstanding high load signal 226 that was previously sent and is still pending with the admission control mechanism 202. If the result of the determine step 524 is no then end at step 522. If the result of the determine step 524 is yes, then at step 526 send the cease high load signal 234 (e.g., ceaseHighLoad (procedure) 234) associated with the procedure 214 to the admission control mechanism 202.

From the foregoing, it may be seen that the new measure technique described above aims to cover all internal resources, e.g., if an internal resource is starting to reach its engineered capacity then this should be indicated (or predicted) by the measurement of one or more procedures regardless of the internal resource type. In particular, the new measure technique introduces a way to steer the admission control mechanism 202 and to determine if the internal resource of the eNodeB 102a (for example) has reached its engineered capacity or not by measuring the latency of procedure(s) 214 and 214' and if desired by monitoring the UE drop levels 230. For example, in a high load scenario it may be monitored that the completion times for the procedure(s) 214 and 214' are stretched and that abnormal UE drop levels 230 are increasing. An abnormal UE drop level 230 may be determined by monitoring UE Context drops or ERAB drops which occur when the eNodeB 102a (for example) or the core network performs a release of the UE 108, or a release of the data radio bearer used by the UE 108 without being requested by the UE 108. Both these drops will adversely impact the end user.

The procedure latency monitor unit 204 may help accomplish this by implementing a method of measuring delta times 216 on procedures 214 and 214' (stop-start times). Then, when the monitored means delta time 222 for one or several procedures 214 and 214' has breached a certain threshold 224, when at the same time UE drop level 230 has increased (if this option is used), a high load signal 226 is sent to the admission control mechanism 202 which may then perform subsequent admission control actions 228. Thus, the procedure latency monitor unit 204 may identify when the eNodeB 102a (for example) is in a high load situation or is likely to reach a high load situation and give the admission control mechanism 202 an opportunity to reduce the affects of the high load situation or prevent the affects of the high load situation.

The procedure latency monitor unit 204 is shown purely on eNodeB level, but it will also impact the core network's load as the signaling load between eNodeB and CN (e.g, MME/S-GW 104) will decrease. This is because the procedure latency measurements may include one or more procedures 214 and 214' that are CN procedure times, which provide end-to-end measurements, e.g., CN to RAN measurements. In addition, the admission control mechanism 202 is distributed amongst the eNodeBs 102a, 102b, and 102c (for example) in the network 100, so the embodiments of the present invention may also spare CN internal resources at high load scenarios since the eNodeBs 102a, 102b and 102c may, for example, block UE connections that would imply load to the CN.

The exemplary embodiments of the present invention have been described above with respect to a LTE wireless telecommunications network and eNodeBs. However, the embodiments may be practiced in any type of wireless telecommunication network where there is a node (e.g., eNodeB, eNB, base station controller, RNC) that manages a cell in which a radio service may be provided to a UE 108. For example, the present invention may be practiced in GSM, WCDMA or CDMA wireless telecommunication networks.

Although multiple embodiments have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A node located in a wireless telecommunications network and configured to administer a number of sessions with a plurality of user equipments, the node comprising:
a procedure latency monitor unit configured to establish a measurement window associated with a procedure within the wireless telecommunications network and during the measurement window is further configured to measure a predetermined number of delta times, where each measured delta time indicates an amount of time that takes place between a start of the procedure and a stop of the procedure;
the procedure latency monitor unit upon completion of the measurement window is configured to take the predetermined number of measured delta times and is further configured to calculate a mean delta time which is an average of the measured delta times;
the procedure latency monitor unit is configured to compare the mean delta time with a predetermined threshold which is also associated with the procedure and if the mean delta time exceeds the threshold then the procedure latency monitor unit is configured to issue a high load signal associated with the procedure; and
an admission control mechanism that is configured to receive the high load signal associated with the procedure and is further configured to activate an admission action.

2. The node of claim 1, further comprising:
a traffic measurement unit that is configured to determine a number of the sessions with the plurality of user equipments which are dropped without being requested to be released by the user equipments and then reports the number of dropped sessions to the admission control mechanism; and
the admission control mechanism upon receiving the high load signal associated with the procedure further determines if the number of dropped sessions with the plurality of user equipments exceeds a predetermined threshold and if yes then activates the admission action.

3. The node of claim 1, wherein the procedure latency monitor unit establishes the measurement window when the procedure has a delta time that exceeds a predetermined threshold where the delta time is an amount of time that takes place between a start of the procedure and a stop of the procedure.

4. The node of claim 1, wherein the procedure latency monitor unit establishes additional measurement windows to measure additional delta times for additional different procedures and then calculates additional mean delta times for the additional different procedures where if one or more of the calculated mean delta times exceed a corresponding threshold then issues one or more high load signals associated with the corresponding one or more different procedures.

5. The node of claim 1, wherein the procedure latency monitor unit after issuing the high load signal associated with the procedure establishes another measurement window to measure multiple delta times for the procedure and then calculates the mean delta time for the procedure where if the calculated mean delta time does not exceed the threshold then issues a cease high load signal associated with the procedure.

6. The node of claim 1, wherein the procedure is one of the following:
a RRCConnectionSetup;
an InitialContextSetup;
an ERABSetup;
a HandoverPreparation; and
a procedure that interacts with another node other than the UEs.

7. The node of claim 1, wherein admission action includes one of the following:
block one or more new user equipments trying to connect to the node;
release one or more user equipments already connected based on a priority class;
block a new data radio bearer setup;
release of one or more data radio bearers; and
reduce observability monitoring.

8. The node of claim 1, wherein the procedure includes at least one of a radio network procedure or a core network procedure.

9. A method implemented by an node located in a wireless telecommunications network and configured to administer a number of sessions with a plurality of user equipments, the method comprising:
establishing, in a procedure latency monitor unit, a measurement window associated with a procedure within the wireless telecommunications network and during the measurement window measuring a predetermined number of delta times, where each measured delta time indicates an amount of time that takes place between a start of the procedure and a stop of the procedure;
taking, in the procedure latency monitor unit, the predetermined number of measured delta times upon completion of the measurement window and calculating a mean delta time which is an average of the measured delta times;
comparing, in the procedure latency monitor unit, the mean delta time with a predetermined threshold which is also associated with the procedure and if the mean delta time exceeds the threshold then issuing a high load signal associated with the procedure; and
receiving, at an admission control mechanism, the high load signal associated with the procedure then activating an admission action.

10. The method of claim 9, further comprising:
determining, in a traffic measurement unit, a number of the sessions with the plurality of user equipments which are dropped without being requested to be released by the user equipments and then reporting the number of dropped sessions to the admission control mechanism; and
determining, in the admission control mechanism, if the number of dropped sessions with the plurality of user equipments exceeds a predetermined threshold and upon receiving the high load signal associated with the procedure then activating the admission action.

11. The method of claim 9, further comprising:
establishing, in the procedure latency monitor unit, the measurement window when the procedure has a delta time that exceeds a predetermined threshold where the delta time is an amount of time that takes place between a start of the procedure and a stop of the procedure.

12. The method of claim 9, further comprising:
establishing, in the procedure latency monitor unit, additional measurement windows and measuring additional delta times for additional different procedures and then calculating additional mean delta times for the additional different procedures where if one or more of the calculated mean delta times exceed a corresponding threshold then issuing one or more high load signals associated with the corresponding one or more different procedures.

13. The method of claim 9, wherein after issuing the high load signal associated with the procedure the procedure latency monitor unit further operates to establish another measurement window to measure multiple delta times for the procedure and then calculate the mean delta time for the procedure where if the calculated mean delta time does not exceed the threshold then issue a cease high load signal associated with the procedure.

14. The method of claim 9, wherein the procedure is one of the following:
 a RRCConnectionSetup;
 an InitialContextSetup;
 an ERABSetup;
 a HandoverPreparation; and
 a procedure that interacts with another node other than the UEs.

15. The method of claim 9, wherein the admission control mechanism activates the admission action to cause one of the following:
 blocking one or more new user equipments trying to connect to the node;
 releasing one or more user equipments already connected based on a priority class;
 blocking a new data radio bearer setup;
 releasing of one or more data radio bearers; and
 reducing observability monitoring.

16. The method of claim 9, wherein the procedure includes at least one of a radio network procedure or a core network procedure.

17. A procedure latency monitor unit which is part of a wireless telecommunication network, the procedure latency monitor unit comprising:
 a processor; and
 a memory that stores processor-executable instructions therein where the processor interfaces with the memory and executes the processor-executable instructions to enable the following:
 establish a measurement window associated with a procedure within the wireless telecommunications network and during the measurement window measure a predetermined number of delta times, where each measured delta time indicates an amount of time that takes place between a start of the procedure and a stop of the procedure;
 take the predetermined number of measured delta times upon completion of the measurement window and calculate a mean delta time which is an average of the measured delta times; and
 compare the mean delta time with a predetermined threshold which is also associated with the procedure and if the mean delta time exceeds the threshold then issue a high load signal associated with the procedure.

18. A method implemented by a procedure latency monitor unit which is located in a wireless telecommunications network, the method comprising:
 establishing a measurement window associated with a procedure within the wireless telecommunications network and during the measurement window measuring a predetermined number of delta times, where each measured delta time indicates an amount of time that takes place between a start of the procedure and a stop of the procedure;
 taking the predetermined number of measured delta times upon completion of the measurement window and calculating a mean delta time which is an average of the measured delta times; and
 comparing the mean delta time with a predetermined threshold which is also associated with the procedure and if the mean delta time exceeds the threshold then issuing a high load signal associated with the procedure.

19. A wireless telecommunications network comprising:
 a core network;
 an node connected to the core network and configured to administer a number of sessions with a plurality of user equipments, the node comprising:
 a procedure latency monitor unit configured to establish a measurement window associated with a procedure within the wireless telecommunications network and during the measurement window measure a predetermined number of delta times, where each measured delta time indicates an amount of time that takes place between a start of the procedure and a stop of the procedure;
 the procedure latency monitor unit upon completion of the measurement window is configured to take the predetermined number of measured delta times and calculate a mean delta time which is an average of the measured delta times;
 the procedure latency monitor unit is configured to compare the mean delta time with a predetermined threshold which is also associated with the procedure and if the mean delta time exceeds the threshold then issue a high load signal associated with the procedure; and
 an admission control mechanism configured to receive the high load signal associated with the procedure and then further configured to activate an admission action.

20. A procedure latency monitor unit which is located in a wireless telecommunications network, the procedure latency monitor unit comprising:
 a processor; and
 a memory that stores processor-executable instructions therein where the processor interfaces with the memory and executes the processor-executable instructions to enable the following:
 establish a measurement window when a procedure in the wireless telecommunications network has a delta time that exceeds a predetermined threshold, where the delta time is an amount of time that takes place between a start of the procedure and a stop of the procedure;
 set a number of delta time measurements for the procedure that are to be completed during the measurement window;
 wait for the procedure to occur;
 when the procedure occurs, calculate a delta time which indicates an amount of time that takes place between a start of the procedure and a stop of the procedure;
 decrement by one the number of delta time measurements that need to be completed during the measurement window;
 determine if completed all of the delta time measurements that were set to be completed during the measurement window;

if the result of the determine step is no, then return and perform the wait operation;

if the result of the determine step is yes, then:
- stop the delta time measurement;
- calculate a mean delta time which is an average of the measured delta times for the procedure;
- check if the mean delta time exceeds a predetermined threshold which is associated with the procedure;
- if the result of the check operation is yes, then send a high load signal associated with the procedure; and
- if the result of the check operation is no, then determine if there is an outstanding high load signal and if not then end otherwise send a cease high load signal associated with the procedure.

21. A method implemented by a procedure latency monitor unit which is located in a wireless telecommunications network, the method comprising:

establishing a measurement window when a procedure in the wireless telecommunications network has a delta time that exceeds a predetermined threshold, where the delta time is an amount of time that takes place between a start of the procedure and a stop of the procedure;

setting a number of delta time measurements for the procedure that are to be completed during the measurement window;

waiting for the procedure to occur;

when the procedure occurs, calculating a delta time which indicates an amount of time that takes place between a start of the procedure and a stop of the procedure;

decrementing by one the number of delta time measurements that need to be completed during the measurement window;

determining if completed all of the delta time measurements that were set to be completed during the measurement window;

if the result of the determining step is no, then returning and performing the waiting step;

if the result of the determining step is yes, then:
- stopping the delta time measurement;
- calculating a mean delta time which is an average of the measured delta times for the procedure;
- checking if the mean delta time exceeds a predetermined threshold which is associated with the procedure;
- if the result of the checking step is yes, then sending a high load signal associated with the procedure; and
- if the result of the checking step is no, then determining if there is an outstanding high load signal and if not then end otherwise sending a cease high load signal associated with the procedure.

* * * * *

UNITED STATES PATENT AND TRADEMARK OFFICE
CERTIFICATE OF CORRECTION

PATENT NO. : 8,620,370 B2
APPLICATION NO. : 13/218593
DATED : December 31, 2013
INVENTOR(S) : Sandberg et al.

It is certified that error appears in the above-identified patent and that said Letters Patent is hereby corrected as shown below:

On the Title Page, Item (75), under "Inventors", in Column 1, Line 2, delete "Upplands Vasby" and insert -- Upplands Väsby --, therefor.

In the Drawings

In Fig. 5, Sheet 5 of 5, for Tag "502", in Line 1, delete "t0" and insert -- $t_0$ --, therefor.

In the Specification

In Column 4, Line 36, delete "by one the" and insert -- by one, the --, therefor.

In Column 5, Line 3, delete "by one the" and insert -- by one, the --, therefor.

In Column 5, Line 65, delete "Si" and insert -- S1 --, therefor.

In Column 9, Lines 53-54, delete "by one the" and insert -- by one, the --, therefor.

In the Claims

In Column 14, Line 62, in Claim 20, delete "by one the" and insert -- by one, the --, therefor.

In Column 16, Line 5, in Claim 21, delete "by one the" and insert -- by one, the --, therefor.

Signed and Sealed this
Twenty-second Day of July, 2014

Michelle K. Lee
*Deputy Director of the United States Patent and Trademark Office*